Jan. 25, 1966     E. E. GUILFORD     3,230,803
METHOD AND APPARATUS FOR SKIVING FOAM SHEETS
Filed Sept. 26, 1963     3 Sheets-Sheet 1
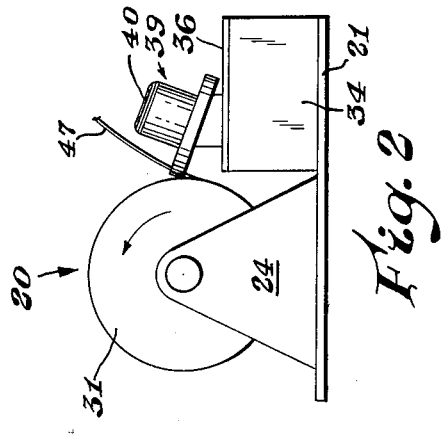
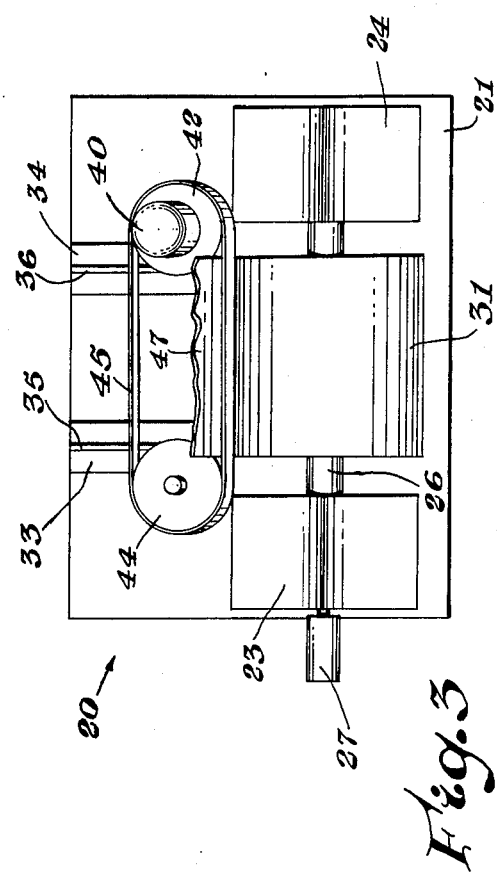
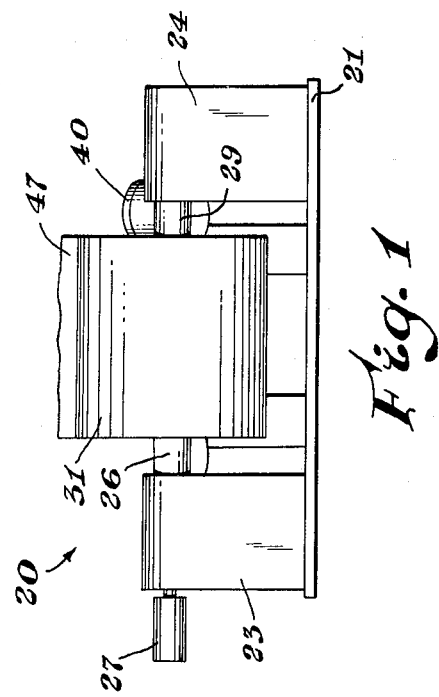
INVENTOR.
Earl E. Guilford
BY
Robert B. Ingraham
AGENT INVENTOR.
Earl E. Guilford
BY
Robert B. Ingraham
AGENT INVENTOR.
Earl E. Guilford
BY
Robert B. Ingraham
AGENT

United States Patent Office

3,230,803
Patented Jan. 25, 1966

3,230,803
METHOD AND APPARATUS FOR SKIVING FOAM SHEETS
Earl E. Guilford, Midland, Mich., assignor to The Dow Chemical Company, Midland, Mich., a corporation of Delaware
Filed Sept. 26, 1963, Ser. No. 311,824
6 Claims. (Cl. 82—46)

This invention relates to a method and apparatus for the skiving of sheets from foam bodies. It more particularly relates to a method and a particular apparatus for severing a thin sheet from a large body of foam plastic material.

In many packaging applications it is desirable to utilize thin sheets of foam plastic material and oftentimes thin sheets of relatively rigid foam plastic material such as synthetic resin foams or expanded resins which are cellular in nature and may be either open cell or closed cell foams. Particularly advantageous and beneficial for packaging operations are the relatively rigid or stiff foams such as those prepared from polystyrene, rigid polyurethane and the like. Such foams are readily prepared by methods well known in the art including the extrusion of a foamable and polymerizable mixture, the extrusion of a thermoplastic resinous material containing suitable volatile gas and the like. Very desirable foams for packaging have a surface which is not smooth and unbroken but which has exposed severed cells. Such cells tend to give the surface of the foam an attractive appearance. Plastic foams prepared by extrusion or molding or other conventional means usually have on their surface a smooth skin or layer of unfoamed material that results in a glossy surface or if the molding or forming operation has not been done well, oftentimes the surface is rough and unattractive. For most applications the extruded or molded product is undesirable and if extreme uniformity of thickness is required with uniform sharp well defined edges, such a foam shape is usually unsuitable. Thin sheets most advantageously are generated by slicing or skiving a larger body of foam material into thin sheets. Such thin sheets have been found very difficult to prepare in an economic manner. Many different cutting devices have been employed in the past to separate the thin foam sheets from parent bodies. Such devices include shears, knives, saws, and the like. When preparing a wide sheet one is generally limited to a saw like action and saws as circular saws, band saws, and the like usually can prepare a satisfactory thin sheet. However, such a sheet is prepared at relatively great expense of the raw material because of the loss of material in the saw kerf. This produces a large quantity of dust which generally must be removed from the foamed sheet prior to its intended end use and represents a considerable loss of material as well as presenting a problem with regard to its removal and disposal. In order to eliminate the undesirable dust, band knives of various shapes, sizes and configurations have been utilized. Band knives have provided a means of producing a thin sheet but the surface generated by such knives generally is not as smooth and uniform as the surface of a product obtained by sawing. Oftentimes sheets produced by band knives are found to be non-uniform in thickness because of a tendency of the blade to lead and due to minor variations in the stock. Various known methods of skiving and apparatus therefore are found to have similar shortcomings wherein the amount of materials lost in the kerf is significant or that a properly cut flat sheet of uniform thickness is not obtained. Many band knives tend to give a texture to the surface, that is they generate tool marks on the work piece. Utilizing band knives at high cutting speeds for foamed thermoplastic resinous material generally presents the added difficulty that the frictional heat generated by the blade passing through the material is oftentimes sufficient to cause melting or softening of the material being cut. This oftentimes tends to smear the plastic material over the openings of the severed cells and present a relatively unattractive surface for many packaging applications. Further, if the blade or band knife reaches a temperature sufficient to melt or heat plastify the material being cut usually there is a strong tendency for the heat plastified material to adhere to the cutting blade. This also results in uneven cutting and oftentimes in the generation of relatively severe tool marks. Even at slow speeds band blades tend to produce an erratic surface, that is, there is observed a tendency for the surface of the material to tear in certain locations and most particularly when thin sheets are being skived from bodies prepared by the molding of large bodies from particulate foamable granules.

It is an object of this invention to provide an improved method of skiving thin sheets of foam from large foam bodies.

It is a further object of this invention to provide skived thin sheets of foams having a smooth uniform surface which show substantially no tool marks.

A still further object of this invention is to provide an improved apparatus for the skiving of thin sheets from a foam body.

Another object of the invention is to provide an apparatus for skiving foam utilizing a band blade and capable of providing rapid skiving and smooth surfaces.

These benefits and other advantages in accordance with the method of the present invention can be readily achieved by skiving a thin sheet from a parent body of an expanded resinous foam material by severing the foam body and pressing the foam body away from the sheet being severed adjacent the portion of the body being severed. The method of the present invention is advantageously practiced utilizing an apparatus comprising a means to support a body of foam to be skived, a band blade having a substantially smooth cutting edge, the cutting edge forming an angle with one of the major surfaces of the blade of from about 30° to about 60° and an angle of from about 120° to about 150° with the opposite major surface of the blade, the cutting edge of the blade being positioned to engage a foam body in such a manner that the surface adjacent the angle from about 30° to about 60° is remote from the major portion of the foam body and means to continuously move the blade in a longitudinal direction and means to move the foam body in angular relationship to the direction of movement of the blade.

These benefits and other advantages of the present invention will become more apparent from the following specification when taken in connection with the drawing wherein:

FIGURES 1, 2 and 3 schematically depict 3 views of one embodiment of an apparatus in accordance with the invention;

FIGURE 4 schematically depicts an enlarged sectional view of a band blade in accordance with the present invention skiving a thin sheet of foam from a parent body;

Figure 4:
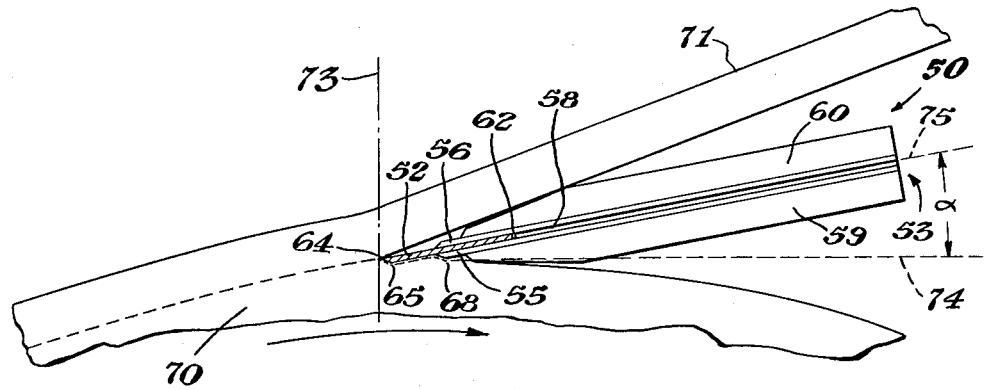

In FIGURES 1, 2 and 3 there is schematically illustrated a skiving apparatus 20. The skiving apparatus 20 comprises a bed 21, a roll support and drive mechanism 23 affixed to the bed or base 21, a roll support 24 is attached to the base 21 and oppositely disposed to the support and drive mechanism 23. Positioned within the support mechanism is a stock engaging mandrel 26. The stock engaging mandrel 26 is operatively connected to the mandrel positioner 27. A stock engaging mandrel 29 is pivotally mounted within the support 24. Supported between the stock engaging mandrels or means 26 and 29 is foamed body 31 having a generally cylindrical shape and being rotatably supported by the mandrels 26 and 29. The foam body 31 is readily rotated by means of the mandrel 26 and the support and drive 23. Generally adjacent the foam body 31 are tool supports 33 and 34. The tool supports 33 and 34 have formed on their uppermost surfaces ways 35 and 36 respectively. A band blade cutting mechanism generally indicated by the reference numeral 39 is slidably supported on the ways 35 and 36 and positioned on the ways by a mechanism not shown. The band blade mechanism comprises a motor 40 which is operatively connected to a driven wheel 42. Oppositely disposed to the driven wheel 42 is an idler wheel 44. A band blade 45 is positioned about the band wheels 42 and 44 and is in operative engagement therewith.

In FIGURES 2 and 3 the band blade assembly is shown skiving a thin sheet 47 of foamed material from the foamed body 31.

In FIGURE 4 there is illustrated an enlarged detailed view of a band blade assembly in accordance with the present invention in engagement with a foamed body and skiving a thin sheet therefrom. The band assembly is generally designated by the reference numeral 50. This cutting assembly is particularly adapted to be employed in a cutting apparatus such as is illustrated in FIGURES 1, 2 and 3. The cutting assembly 50 comprises a band blade 52 and a band blade support assembly 53. The support assembly 53 comprises a work piece engaging blade guide 55 and a sheet engaging blade guide 56. The guides 55 and 56 are separated by a spacing guide 58. The guides 55, 56, and 58 are supported by the stiffening plates or means 59 and 60. The guides 55, 56, the spacer 58 and the stiffening means 59 and 60 are assembled in rigid relationship to one another. The guides 55 and 56 together with one edge of the spacer 58 form a blade receiving groove or channel 62. Partially within the channel 62 is positioned the band blade 52. Remote from the spacer 58 is the band blade 52 which terminates in a cutting edge 64 and a foam body engaging edge 65. The cutting edge 64 has an angle of from about 30° to 60° between the major surface of the band blade remote from the foam body whereas the edge 65 forms an obtuse angle of from about 120° to about 150°. The cutting edge 64 of the blade 52 forms an acute angle whereas the foamed engaging portion of the blade forms an obtuse angle. Similarly the foam engaging guide 55 terminates adjacent the band blade 52 in a manner generally similar to the termination of the band blade 52. Thus the obtuse angled foam engaging terminal edge 68 is obtained on the guide 55. The edge of the spacer 58 which forms the bottom of the channel or groove 62, engages the rear face of the blade 52 remote from the cutting edge 64.

In FIGURE 4 the cutting assembly 50 is shown in engagement with a foam work piece 70 and is serving therefrom a thin foam sheet 71. A broken line 73 is shown passing through the cutting edge 64. The line 73 is a portion of a radius of the work piece 70. The dotted line 74 represents a plane normal to the line 73 which is tangent to the projected surface of the work piece prior to the point of being cut. A second dotted line 75 is a center line projected through the cutting blade 52 forming an angle α with the tangent 74. This angular displacement α represents the cutting angle of the band blade 52.

Figure 5:
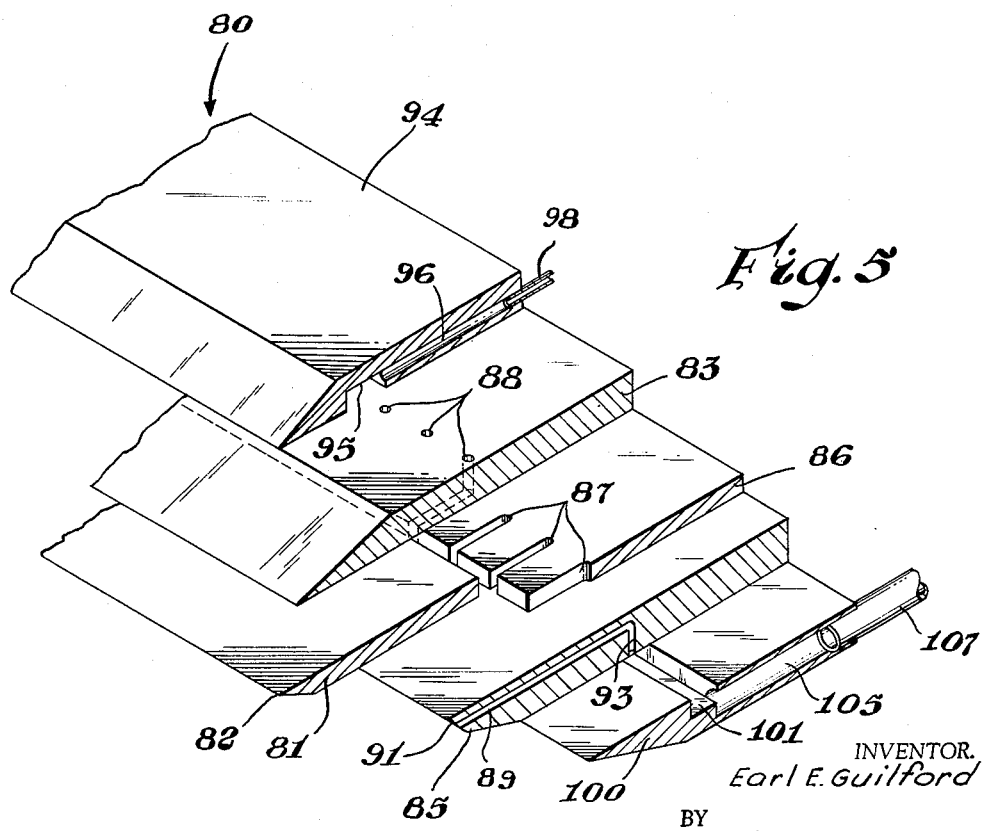
FIGURE 5 is an isometric fragmentary sectional view of an alternate cutting device.

In FIGURE 5 there is illustrated a portion of an alternate cutting assembly in accordance with the present invention generally designated by the reference numeral 80. The assembly 80 comprises a band blade 81 having a cutting edge 82. The band blade 81 is supported on its side adjacent the cutting edge by the blade support 83 and on the side remote from its cutting edge 82 by the blade support 85. The supports 83 and 85 are separated by means of a spacer 86. Within the blade support 83 are provided a plurality of apertures 88 which extend between the opposite major surfaces thereof. The blade support 85 is provided with a plurality of passageways 89 which provide communication between a work piece engaging edge 91 of the support 85 and location 93 remote from the edge 91 and from the blade 81. The spacer 86 is provided with a plurality of slots or passageways 87 which provide full communication between a location within the spacer 86 and the edge of the spacer 86 adjacent the blade 81. Generally adjacent the blade support 83 is a stiffener or support 94, a passageway 95 is provided within the support or stiffener 94. The passageway 95 extends substantially the full length of the cutting assembly. Also disposed within the stiffener 94 is a passageway 96 which is in communication with the generally longitudinal passageway 95. Remote from the passageway 95 the passageway 96 is in full communication with the conduit 98. Oppositely disposed to the stiffener or support 97 is a second stiffener or support 100. The support 100 has formed in one face thereof a passageway 101. A passageway 105 is also provided within the support 100. The passageway 105 is in full communication with the conduit 107.

In FIGURES 6, 7, 8, 9 and 10 there are illustrated plan views of the various portions making up the blade support in order to more clearly illustrate the relationship of the various passageways and apertures. In order to obtain the views of FIGURES 6–10, the cutting assembly 80 of FIGURE 5 is rotated until the cutting edge 82 of the blade 81 is in the plane of the paper and the assembly is then positioned with the cutting blade uppermost.

Figure 6:
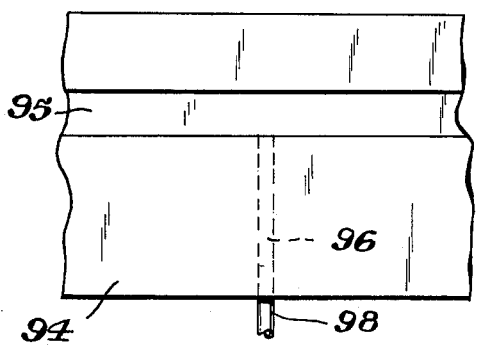
FIGURES 6, 7, 8, 9 and 10 are fragmentary plan views of the blade supporting components of the device of FIGURE 5.

FIGURE 6 illustrates a view of the stiffener 94 having formed on its surface the channel 95, the passageway 96 and the fluid conduit 98.

Figure 7:
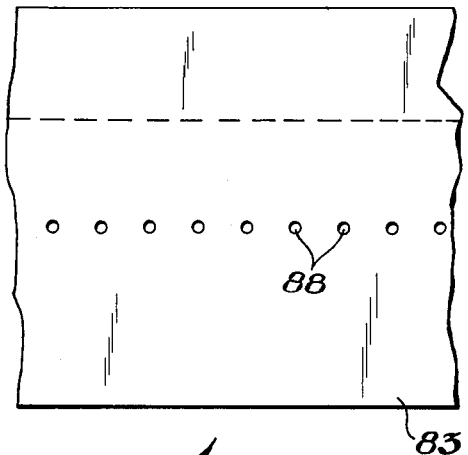

FIGURE 7 shows the location of the apertures 88 within the blade support 83.

Figure 8:
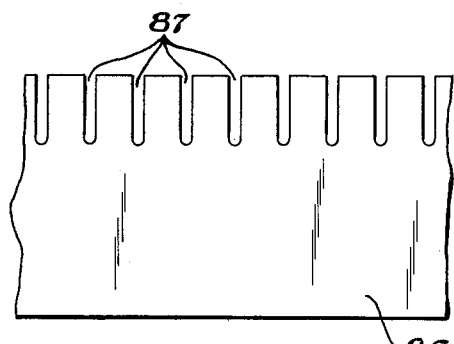

FIGURE 8 illustrates the arrangement of the slots 87 in the spacer 86.

Figure 9:
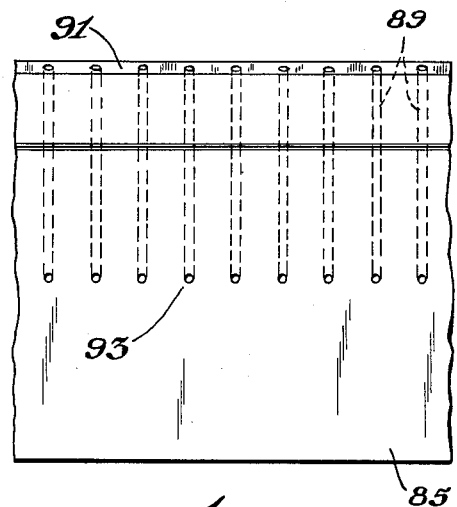

FIGURE 9 depicts the arrangement of the passageways 89 in the blade guide 85 and their termination at the foam or work engaging surface 91.

Figure 10:
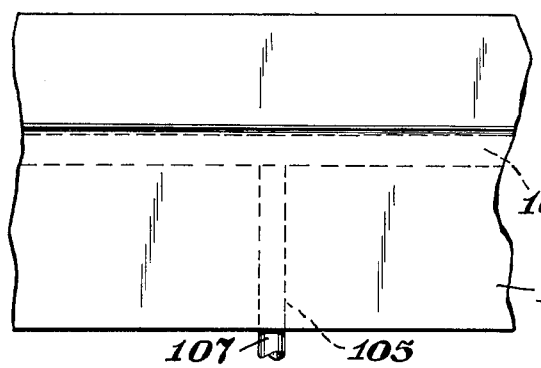

FIGURE 10 illustrates the arrangement of the passageways 101, 103, 105, and the conduit 107 in the stiffener 100.

Operation of the present invention is best understood with initial reference to FIGURES 1, 2 and 3 wherein a work piece such as work piece 31 is positioned in a suitable holder and rotated in engagement with a cutting device such as the device 39. The cutting assembly 39 is operatively connected to the rotating mechanism contained within the support 23 in such a manner that the assembly 39 is advanced into the work piece at a predetermined rate per revolution of the work piece. The band blade is maintained in motion by the motor or driving means 40 as the work piece is rotated thus resulting in a skived sheet such as the sheet 47 of predetermined thickness. In order to provide a suitable smooth surface on the skived sheet the band blade must be sharpened or formed to provide an included angle at its cutting edge to from about 30° to about 60° and the blade must be placed in such a manner that the acute cutting edge is contiguous with the surface of the blade remote from the work piece and that the side of the blade adjacent the work piece shall form an obtuse angle with the edge surface of the blade which forms a portion of the cutting edge. The cutting operation can be understood by reference to FIGURE 4. The cutting edge 64 of the blade 52 severs the foam body 70 at its tip. However, as the foam is severed it is also stressed by the depression of the freshly generated surface of the work piece by the foam engaging portion 68 of the blade 65. The depression of the work piece 70 by the surface 68 tends to force the foam away from the sheet 71 as the blade progresses into the roll. Thus in effect the work piece 70 is cut from the skived sheet 71 rather than cutting the sheet 71 from the work piece as would be the case if the blade were inverted or if a conventional blade were utilized for the skiving operation. It is critical to the practice of the present invention that the body or work piece be depressed in the manner depicted in FIGURE 4. Otherwise a rough surface or an imperfect surface is obtained on the skived sheet. The lower blade guide 55 with its foam engaging surface 68 deflects the thin layer of the deformed cells against the surface to prevent particles of the foam or edges of the severed cells from wedging between the blade and the blade guide. Usually for most foam materials the angle of attack i.e., α, as shown in FIGURE 4, should be a relatively small positive value. For example, when a blade edge bevel of about 40° is utilized and foam of 1/32 to about 1/8 of an inch is being cut an angle α of about 20°–25° is employed. Alternately if a thicker sheet is to be skived from the foam body such as a 3/8 inch sheet, an angle of about 12° is generally advantageous whereas utilizing a one inch sheet an angle of about 6° is generally suitable. As the blade edge bevel is reduced it is found that the angle of attack α should also be reduced. Although in the embodiment illustrated in the drawings a portion of the blade is employed to depress the foam, however if desired an extremely thin band blade may be utilized and a thin blade support such as a support 55 may be placed very close to the cutting edge and a similar cutting action will be achieved. However, for most operations it is usually desirable to employ a conventional band blade sharpened in the manner of that of FIGURES 4 and 5 wherein the edge of the blade adjacent the cutting edge is employed to depress the foam. This serves to provide apparatus which is less subject to accidental mechanical damage than if an especially thin blade and a separate depressor are employed. Generally when thicker sheets are to be skived it is desirable that the blade protrude from the blade supports for a greater distance than when a thin sheet is being prepared.

Relatively high rates of cutting are obtained utilizing the present invention. For example, a generally cylindrical polystyrene billet or work piece is skived to produce a sheet having a thickness of from about 1/32 of an inch to about 1 inch at rates up to several hundred feet per minute. Usually in the skiving of such polystyrene it is desirable to maintain a ratio of blade speed to cutting speed of about 4:1. That is, the ratio of the feet per minute traveled by the band blade to the circumferential or linear distance of skived sheet produced. Usually for many applications it is desirable to fabricate the foam body into a generally cylindrical form. Advantageously when using expandable particles or a pourable foamable and hardenable resin this is easily accomplished. The cylindrical configuration of the foam stock usually generates the maximum length of sheet when it is spirally cut. However, slabs, planks, boards and other large and small bodies of foam are readily skived into thin sheets by a blade in accordance with the invention when moved through the foam body on a linear path. The embodiment of the cutting blade depicted in FIGURE 4 is found to be advantageous for the skiving of thin sheets of foams at speeds up to about 100 feet per minute. As higher cutting rates are desired or as a particularly stiff or a rigid foam is being skived which exhibits a high coefficient of friction the cutting assembly shown in FIGURES 5–10 is beneficially employed. In such cases the temperature of the blade is significantly reduced by applying a cooling fluid such as air to the conduits 98 and 107 to remove the heat generated by the friction between the blade and the foam body. If a cooling fluid under pressure is applied to the conduit 98 the fluid passes through the passageway 96 into the passageway 95 through the apertures 88 in the blade guide 83 and into the slots 87 of the spacer 86. The air emerging from the slots 87 contacts and flows about the blade 81 tending to both cool and lubricate its movement within the recesses formed by the guides 83 and 85 and the spacer 86. Further reduction in friction is attained when cooling and/or lubricating fluid is applied to the conduit 107 forcing the fluid through the passageway 105 into the passageway 101 from the passage 101 to the channels 103, out of the channels 103 into the passageway 89 where it is expelled on the work contacting surface or edge 91 of the blade guide 85. The passage of a fluid through these passages effectively and significantly reduces the temperature of the blade guide adjacent the blade and serves to provide lubrication at the point where the blade guide 85 contacts the foam work piece. A wide variety of the foam materials are easily cut utilizing the apparatus in accordance with the invention. Beneficially the thickness and size of the sheet to be skived may be chosen almost at will and is dependent only upon the physical characteristics of the foam being skived. That is, in order to obtain an acceptable skived sheet for most purposes the foam should be sufficiently flexible so that the skived sheet may lie in a plane after being cut from the roll. The depressing action of the blade will cause a minor reduction in the thickness of the sheet skived. For example, when an angle of attack of 15° is utilized with a blade thickness of about 0.018 inch and sharpened to a 40° cutting edge a feed rate of 0.133 inch per revolution will provide a sheet having an actual thickness of 0.129 inch when polystyrene is employed having a cell size of about 1/10 of a millimeter. A wide variety of foaming material is readily cut in accordance with the method and apparatus of the present invention. Among the foam products which are easily and successfully cut into skived sheets of varying thicknesses are expanded plastic resinous materials such as foamed polystyrene, both of the extruded variety and the molded type, foamed polyurethanes, both rigid and flexible, foamed polyesters, foamed phenolic resins, and such materials as foam rubber, foam glass and foamed metals are quickly and easily skived.

As is apparent from the foregoing specification, the apparatus and method of the present invention are susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. In a method of skiving a foam plastic body wherein the foam body to be skived is moved relative to a band blade, the band blade moving in a longitudinal direction, the improvement which comprises continuously compressing the foam body from which a sheet is being skived as the sheet is being skived immediately adjacent and behind the cutting edge of the band blade, the compressing of the foam body being in a direction away from the sheet being skived.

2. The method of claim 1 wherein the foam body is rotated relative to the band blade.

3. The method of claim 1 wherein the band blade is fluid cooled while the blade is in contact with the foam body.

4. The method of claim 3 wherein the band blade is gas cooled.

5. The method of claim 1 wherein the foam body is a closed cell rigid thermoplastic resinous material.

6. The method of claim 5 wherein the foam body comprised a polystyrene foam.

(References on following page)

References Cited by the Examiner

UNITED STATES PATENTS

| | | | |
|---|---|---|---|
| 205,271 | 6/1878 | Hyatt | 144—209 X |
| 337,630 | 3/1886 | Shavalier et al. | |
| 929,679 | 8/1909 | Lorenz | 82—47 |
| 1,177,293 | 3/1916 | Anderson | 83—176 |
| 1,940,105 | 12/1933 | Schmid | 144—209 |
| 1,986,587 | 1/1935 | Ludington | 82—47 |
| 2,173,336 | 9/1939 | Lamere et al. | 69—10 X |
| 2,804,141 | 8/1957 | Danner | 83—201 X |
| 2,815,562 | 12/1957 | Wilkie et al. | 143—158 |
| 2,821,254 | 1/1958 | Kernen | 69—15 X |
| 2,987,947 | 6/1961 | Light | 82—46 |
| 3,035,344 | 5/1962 | Brown | 30—115 |
| 3,094,026 | 6/1963 | Pottle | 82—46 |

FOREIGN PATENTS

| | | |
|---|---|---|
| 643,248 | 4/1937 | Germany. |
| 917,502 | 9/1954 | Germany. |
| 572,515 | 1/1958 | Italy. |

WILLIAM W. DYER, Jr., *Primary Examiner.*

LEON PEAR, *Examiner.*